PARAMETRIC OSCILLATOR CIRCUIT WITH FREQUENCY CHANGING MEANS

Filed Oct. 30, 1958 2 Sheets-Sheet 1

INVENTORS
WALTER R. BEAM &
FRED STERZER
BY Morris L. Rabkin
ATTORNEY

PARAMETRIC OSCILLATOR CIRCUIT WITH FREQUENCY CHANGING MEANS

Filed Oct. 30, 1958

INVENTORS
WALTER R. BEAM &
FRED STERZER
BY Morris L. Rabkin
ATTORNEY

United States Patent Office 3,051,844

Patented Aug. 28, 1962

3,051,844

PARAMETRIC OSCILLATOR CIRCUIT WITH FREQUENCY CHANGING MEANS

Walter R. Beam, Princeton, and Fred Sterzer, Monmouth Junction, N.J., assignors to Radio Corporation of America, a corporation of Delaware Filed Oct. 30, 1958, Ser. No. 770,822

11 Claims. (Cl. 307—88)

This invention relates to parametric oscillator circuits, and to methods for operating such circuits.

There is a need (for example, in information handling systems and computers) for circuits capable of very high speed response and recovery. Computers are called upon to handle vast quantities of information in a very short time period. The speed at which such machines can manipulate information is limited, in part, by the speed of response of the various components and circuits employed therein.

Many circuits employed in such machines are of the type which has more than one stable state, and the circuits may be operated in any of the stable states depending upon circuit conditions. One such circuit may be, for example, a bistable multivibrator, or flip-flop. The well-known form of flip-flop has two stable states and two input terminals, each of which corresponds with one of the two states. The circuit remains in either state until caused to change to the other state by the application of an input signal. Such a device may be arranged as a scale-of-two, or single stage binary, counter. Several such stages may be combined to form a counter wherein the status of the several stages provides an indication of the number of input signals or pulses which have been received.

Most known circuits of the type described are limited in the speed at which they can be operated. Additionally, power requirements are often quite high and heat dissipation poses a problem. The present invention provides a circuit having more than one stable state and having a parametric oscillator as its principal component. Oscillators of this type are capable of operating in the microwave region and generally have low power requirements.

The basic idea of a parametric oscillator stems from Mathieu's equation and the physical problems it represents. In general, any circuit or device whose resonant frequency is changed at one of certain prescribed rates may be caused to oscillate. This may be effected, for example, by driving the circuit with a pumping signal. When, for example, the circuit comprises a voltage-sensitive, variable capacitance element, the effective capacitance depends upon the amplitudes of the A.C. and D.C. voltages across its terminals. If the "natural" frequency and component values are properly selected with relation to the pumping signal, effective capacitance variation is such that the circuit may be tuned through resonance by changing the amplitude of the pumping signal. The natural frequency may be defined as the small signal resonant frequency of the tank circuit.

When the natural frequency lies close to a frequency at which oscillations can be sustained by the pump signal, the circuit may be driven into oscillation by adjusting the amplitude of the pump signal to change the apparent capacitance of the variable element an amount sufficient to tune the circuit to the frequency at which oscillations will be sustained. A large output will then be obtained at that frequency. The sustained frequency, as is known, is one of certain permissible frequencies related in a simple manner to the pump frequency.

Viewed in another way, oscillations in a parametric oscillator may be considered to be the result of negative conductance in the tank circuit. The negative conductance is the result of the action of the pump signal on the variable reactance element, and its magnitude is, in part, a function of the amplitude of the pumping signal. Oscillations will be sustained when the negative conductance exceeds the positive conductance in the circuit.

As an example of the foregoing description, assume that the parameters of the tank circuit are adjusted in known fashion so that the natural frequency $f_0$ lies close to one-half the pump frequency $f_p$. When the amplitude of the pump signal exceeds a critical value, the tank circuit will be driven into oscillation, and the oscillations will lock at a frequency $f_p/2$ because of the action of the pump signal on the variable reactance element. Two possible phase outputs may be obtained from the oscillator. These outputs are equal in amplitude but differ in phase by 180°. Which output will be obtained will be determined by conditions existing in the tank circuit when oscillations commence.

The present invention provides a novel method and means for switching the output from one phase to the other. An external switching signal is momentarily applied to the oscillator to change the operating parameters so that the operating frequency of the tuned circuit lies outside the region in which parametric oscillations may be sustained. In effect, the switching signal changes the natural frequency of the tank circuit. In such a case, the parametric oscillations are not sustained, and the oscillations tend to die out at a new frequency $f_2$, which frequency is determined, in part, by the amplitude of the switching signal. When the switching signal is removed, the tank circuit will again oscillate at the frequency $f_p/2$, and the phase in which oscillations resume will be determined by the phase of the damped oscillations in the tank at that time. The phase will be switched if the duration of the switching signal is such that approximately an odd number of half cycles at the parametric oscillator frequency $f_p/2$ have been gained or lost during this interval. This may be expressed mathematically as follows:

$$T \simeq \frac{N}{|2(f_2 - f_p/2)|}$$

where T is the time duration of the switching signal, N is any odd integer, and $f_2$ and $f_p/2$ represent the frequencies of the damped oscillations and parametric oscillations, respectively.

It is an object of the present invention to provide a parametric oscillator which may be operated at a very high frequency.

It is another object of the present invention to provide an improved parametric oscillator which has more than one stable state.

It is still another object of the present invention to provide a novel method of switching the operating state of such a parametric oscillator.

Yet another object of the present invention is to provide a high speed scaling circuit which includes a parametric oscillator of the type described.

The foregoing and other objects, advantages and novel features of this invention, as well as the invention itself both as to its organization and mode of operation, may be best understood from the following description when read in connection with the accompanying drawings in which like reference numerals refer to like parts and in which.

Figure 1:
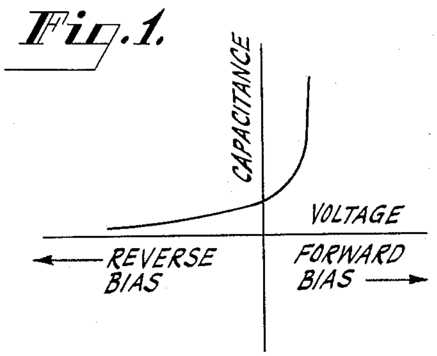
FIGURE 1 is a graph illustrating the relationship of capacitance to applied voltage for one type of voltage-sensitive, variable capacitance diode.

A semiconductor diode can act as the active element in a parametric oscillator because its capacitance is a function of the effective voltage across its terminals, and this voltage may be varied in accordance with the pump signal. The capacitance versus voltage characteristic of one type of semiconductor diode is illustrated graphically in FIGURE 1. When the diode is made part of a resonant circuit, variation of the voltage and, consequently, the capacitance of the tank circuit will change the resonant frequency of the tank circuit.

Although the various embodiments of this invention will be shown and described as comprising voltage-sensitive diodes, it should be understood that the invention is not meant to be limited to the use of such devices. Parametric oscillators, as is known, may be constructed having other variable reactance elements (for example, ferrite cores, iron core transformers, etc.). The elements of variable reactance may be of the current sensitive type.

Figure 2:
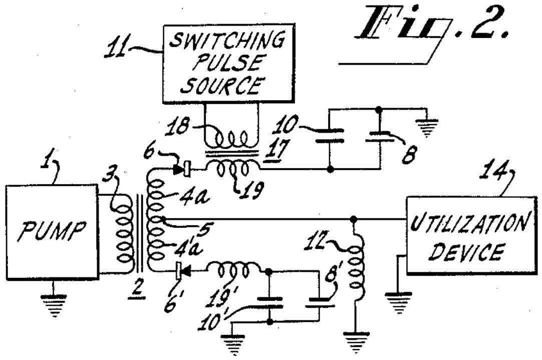
FIGURE 2 is a circuit diagram which illustrates a lumped constant parametric oscillator and a method for causing the state of said oscillator to change according to the present invention.

FIGURE 2 illustrates one method of switching the operating phase of a parametric oscillator. The oscillator shown is of the lumped constant type. The output of a local oscillator, or pump 1, is applied across the primary winding 3 of a signal input transformer 2. The secondary winding of this transformer 2 is center tapped, and an inductor 12 is connected between the center tap 5 and a point of reference potential, illustrated as circuit ground. A voltage-sensitive, variable capacitance diode 6 is connected in series with the secondary winding 19 of a pulse input transformer 17. The series combination is, in turn, connected between the end terminal of the upper half *4a* of the signal input transformer 2 and ground. If the diode 6 is of the type which draws substantial current in the forward direction, it is preferable to provide a suitable biasing source, such as a battery 8, for biasing the diode in the normally nonconducting, or back direction. The battery 8 is preferably of such value as to prevent the diode from being driven in the forward direction in response to alternating pump voltage excursions. A capacitor 10 may be connected across the battery to shunt out extraneous high frequency transients.

The lower half *4a′* of the secondary winding of the signal input transformer 2 is connected in a similar circuit, corresponding components being designated by primes (′). The windings 19, 19′ may be secondary windings of the same pulse input transformer 17. A source 11 of switching pulses is applied to the primary winding 18 of this transformer 17. The switching pulse source 11 may be any suitable source of substantially D.C. pulses. In general, it is immaterial whether the pulses are of a positive or negative polarity, provided that other conditions are satisfied. In the present example, of course, the pulses applied to the separate tank circuits should have the same effect on those circuits.

It will be apparent to one skilled in the art that only one resonant circuit is necessary in the present instance. The particular configuration shown, however, has the advantage that components of the pump frequency are cancelled out in the inductor 12 by action of the two resonant circuits. The output signal may be taken from across the inductor 12 and applied to a utilization device 14 which may be, for example, a phase comparator. For purposes of the present invention, it has been found that the circuit operates satisfactorily when the resonant circuits are tuned so that parametric oscillations are sustained at one-half the pump frequency. The phase of the output signal may be switched by 180° by momentarily altering the biases across the diodes 6, 6′ with a pulse of selected amplitude and length. The amplitude and length are selected in accordance with the principles previously discussed.

If the bistable circuit described is to be used in a system wherein the binary "one" is represented by R.F. signals of the parametric oscillator frequency and in phase with one of the two outputs, and the binary "zero" is represented by R.F. signals of the same frequency and in phase with the other output, then the output from the parametric oscillator may be employed directly in such a system. If the binary "one" and binary "zero" appear in the system in selected time intervals, the utilization device 14 may be, for example, a sampling device.

It is believed that the tank circuit responds to an applied pulse in the following manner: The amplitude of the pulse determines the deviation of the diode 6 capacitance from its nominal value. The resonant frequency of the tank circuit is thereby altered and the oscillations die out at a different frequency. When the pulse is removed, oscillations will build up at the original subharmonic frequency. The phase of the renewed subharmonic oscillations will be determined by conditions existing in the tank circuit at that time after the pulse has been removed when the amplitude of the pump signal exceeds the critical value for sustaining oscillations. These conditions may be predetermined by a proper selection of the pulse amplitude and length. The amplitude determines the frequency of decaying oscillations and the length determines the phase of the signal present in the tank when the tank circuit is again able to resume oscillations at the subharmonic frequency.

Figure 3:
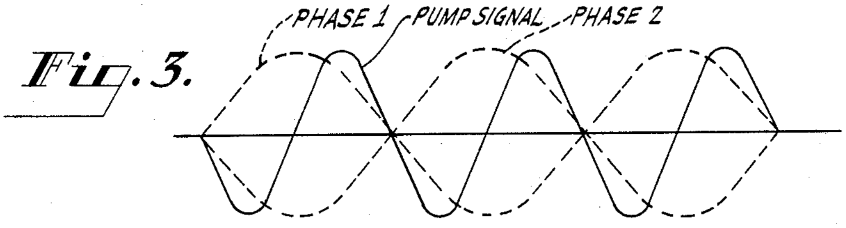
FIGURE 3 is a set of curves which illustrates the phase relationships of the two possible outputs of a bistable parametric oscillator to that of the pump signal when practicing the present invention.

FIGURE 3 illustrates graphically the two possible output phases that may be obtained from a parametric oscillator oscillating at one-half the pump frequency. As explained herebefore, the utilization device 14 may be a phase comparator, to which is also applied a phase reference signal. The output from the parametric oscillator will thus be either in phase or 180° out of phase with this reference signal. The outputs are shown by the dash lines marked "Phase 1" and "Phase 2," while the pump signal is shown by the solid line.

Figure 4:
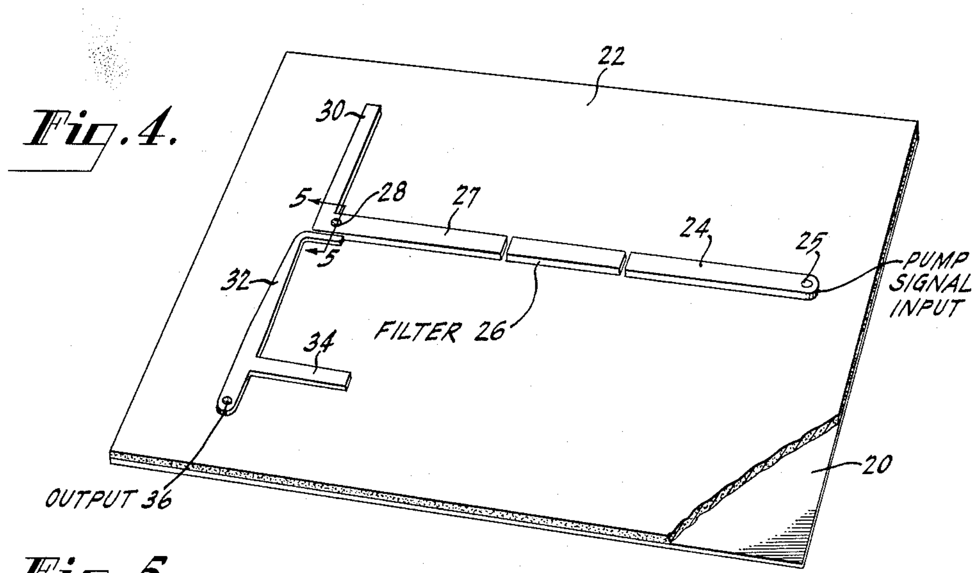
FIGURE 4 is a perspective view of a preferred parametric oscillator capable of very high frequency operation in accordance with the present invention.

FIGURE 4 illustrates, in perspective, a preferred parametric oscillator suitable for operation at very high frequencies. The components are of so called strip transmission line construction. Such strip transmission lines may be constructed by employing a metal ground plate 20, which may be copper, applied as a backing on one surface of a suitable dielectric material 22. On the other surface of the dielectric 22 are strips of copper which may be established by printed circuit etching or plating techniques to form the desired circuit. A transmission line is formed between the strip copper and the spaced ground plate 20. The input from the pump may be coupled to the section 24 of strip transmission line at a point 25 from another transmission line (not shown), such as a coaxial line, by means of a known type of transducer. A suitable transducer for this purpose is described in the copending application of Donald J. Blattner and Fred Sterzer, Serial Number 760,225, filed September 10, 1958, for "Logic Circuits," and assigned to the assignee of the present invention. As described in this copending application, these transducers preferably include an outer conductor connected to the ground plate and an inner conductor which passes through an aperture in the ground plate to make connection with the strip line as at the point 25.

Figure 5:
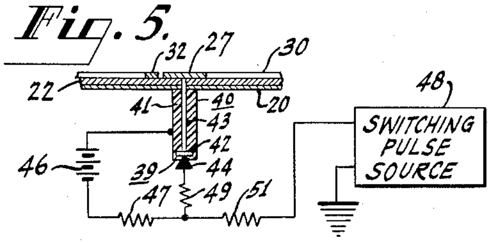
FIGURE 5 is a cross-sectional view of a detail of FIGURE 4 taken along the line 5—5 of FIGURE 4 and showing certain circuit components connected thereto.

The parametric oscillator circuit comprises the section 27 of strip transmission line and a voltage-sensitive, variable capacitance diode 39 mounted at 28, in the manner illustrated in FIGURE 5. The diode 39 and its associated section 27 of strip transmission line form a tank circuit. Although the parameters may be adjusted so that parametric oscillations will be sustained at any of the permissible frequencies, we prefer to operate the circuit at one-half the pump frequency. A section 26 of strip transmission line is inserted between the oscillator section 27 and the section 24 to which the pump signal is coupled. The section 26 is preferably one-half wave length at the pump frequency and serves as a filter which passes the pump signal to the oscillator and prevents signals at the oscillator frequency from being fed back to the pump. Inasmuch as the circuit is physically open between the oscillator and the pump, it is necessary to provide a D.C. return from the parametric oscillator to ground. A section 30 of strip transmission line has been provided for this purpose. The section 30 is approximately one quarter wave length at the oscillator frequency, and the end furthest from the diode 39 is connected to the ground plate 20.

The coupling for the output is in the form of a tapered sections 32 of strip transmission line which tapers down to a very small fraction of the normal width of the strip conductor and approaches within perhaps 0.02 inch of the diode end of the section 27. Coupling may be decreased by shaving off part of the end of the coupling section 32, or increased by connecting a wire on the surface of the coupling section 32 to apporach nearer the diode resonator. A filter is provided to remove components of the pump signal from the output. Such a filter may be a stub 34, which is ¼ wavelength at the pump frequency and grounded at its outer end. A suitable transducer may be connected, for example, at the point 36, if it is desired to transmit the output over a transmission line other than strip transmission line. Such a transducer may be of the type described in the aforementioned copending application.

FIGURE 5 illustrates the manner in which the diode 39 may be inserted into the circuit. A transducer 40 includes an outer conductor 41 connected to the ground plate 20, and an inner conductor 43 which passes through an aperture in the ground plate to make connection to the section 27 of strip transmission line. Suitable impedance matching may be provided. The transducer 40 may have a mounting at its termination for the variable capacitance diode 39. The cathode 42 of the diode is connected to the inner conductor 43. The diode is back-biased by a suitable biasing source, such as by a battery 46. The positive terminal of the battery is connected to the outer conductor 41 of the transducer 40. The negative terminal of the battery 46 is connected to the anode 44 of the diode through resistors 47, 49. The diode 39 and battery 46 may be reversed, if desired. A source 48 provides pulses for switching the phase of oscillations. The pulse source 48 is indicated schematically as being connected between the anode 44 and ground. Since these pulses have substantially lower frequency content than the oscillations, they may be applied through a resistor 51 to the junction of resistors 47, 49. The pulses may also be applied in series with the diode.

The operation of the parametric oscillator is similar to that described above with respect to the lumped constant oscillator of FIGURE 2. The output may be used in a similar manner. If the resonant circuit is oscillating at a frequency one-half that of the pump frequency, the circuit may have two separate and distinguishable outputs which are equal in amplitude, but which differ in phase by 180°. The amplitude and length of the pulses from the pulse source 48 are selected so that the output is switched from one phase to the other in response to the application of a pulse.

The elements of the circuit may alternatively be selected in value so that the oscillator is multistable, that is to say, it can have more than two separate and distinguishable stable outputs. For example, if the circuit is resonant at a frequency $f_1/n$, where $f_1$ is the frequency of the pump and $n$ is an integer, the circuit may have $n$ stable states. The shift in phase in response to an applied pulse will be determined by the amplitude and length of the pulse, and will be cyclic in nature. That is to say, if the phases are designated 1, 2, 3 . . . $n$, and if the first pulse shifts the operating state from phase 1 to phase 2, then the next pulse will shift the operating state from phase 2 to phase 3. In a similar manner, if the first pulse shifts the operating state from phase 1 to phase 3, then the next pulse will shift the operating state from phase 3 to phase 5. It is to be noted that this is precisely the characteristic of a counter or scaling circuit.

Figure 6:
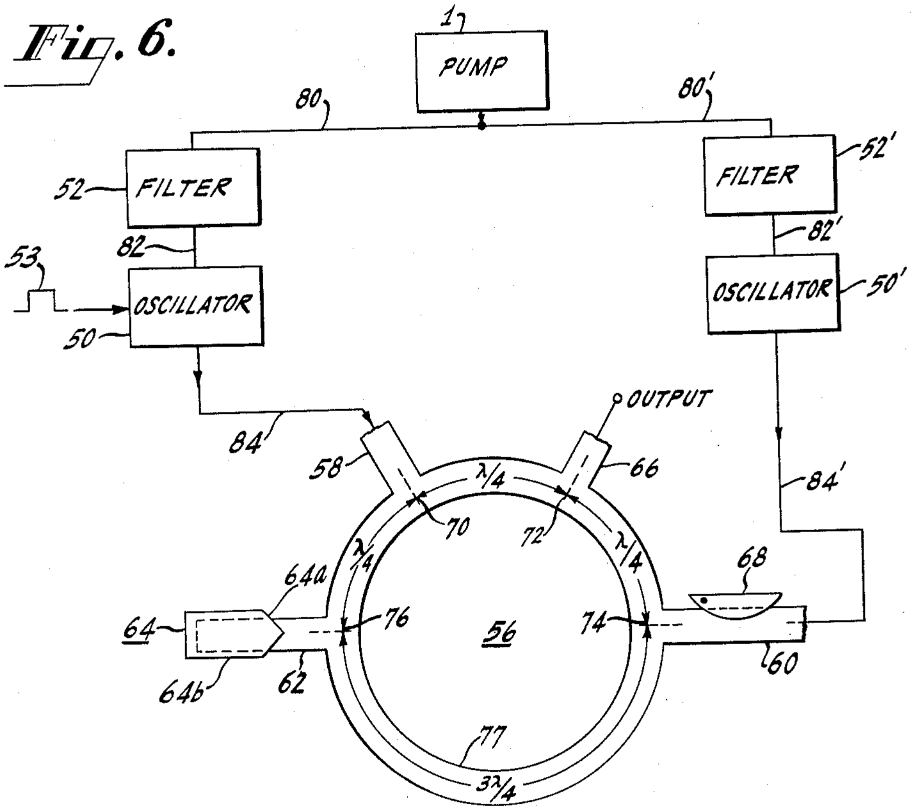
FIGURE 6 is a view, partly in block form and partly in plan view, of a counter, or scaling circuit, according to the present invention.

A scaling, or counting, circuit embodying the parametric oscillator of FIGURE 4 is presented in FIGURE 6. A portion of the circuit is shown in schematic form for convenience. The output of the pump 1 is transmitted over separate lines 80, 80′ to filters 52, 52′. These filters allow signals at the pump frequency to pass, but they block signals at the parametric oscillator frequency. Signals passing through the filters 52, 52′ are coupled to parametric oscillators 50, 50′, respectively, over transmission lines 82, 82′. Oscillator 50 is preferably of the type shown in FIGURE 4 and described previously, and is driven into oscillation at a frequency one-half that of the pump 1. The output of this oscillator 50 is switched 180° each time a pulse 53 is applied. The pulse 53 is shown as a positive pulse for illustrative purposes only. Oscillator 50′ may be any suitable oscillator, preferably a parametric oscillator similar to oscillator 50, except that no phase shifting pulses are applied thereto. Oscillator 50′ serves as a reference oscillator, as will be explained in detail below.

The outputs from oscillators 50 and 50′ may be compared in any suitable comparison circuit. Such a comparison circuit may be a magic T, or rat-race, or other equivalent, hybrid circuit for all of which the term "hybrid circuit" (or "hybrid junction") is used herein as a generic term. The junction 56 has a first input arm 58 to which the output of oscillator 50 is transmitted over a line 84. The output from oscillator 50′ is transmitted over a line 84′ to a second arm 60 of the junction. A third arm 62 is terminated in a matched obsorptive termination 64, such as is known in the art, and which may be a thin, flat piece of dielectric material, coated on the side adjacent to the terminated arm 62 with absorptive material, such as graphite. The termination 64 may have a tapered portion 64*a* which is laid over the end part of the arm 62 and a rectangular portion 64*b* into which the tapered portion 64*a* merges. The output from the hybrid junction 56 is derived from a fourth arm 66. The arms 58, 66, 60 and 62 have, respectively, junctions 70, 72, 74 and 76 with a circular path 77 which is $3\lambda/2$ in mean circumference, where $\lambda$ is the wavelength at the parametric oscillator frequency.

Electrically, the first arm junction 70 is ¼ of a wavelength at the oscillator frequency from both the termination arm junction 76 and the output arm junction 72. The output arm junction 72 is ¼ wavelength from the junction 74 of the second input arm 60. The second input arm junction 74 is ¾ of a wavelength from the junction 76 of the termination arm 62.

In operation, when the output from oscillator 50 is equal in amplitude to the output of oscillator 50′, and when the outputs arrive in phase at the respective input arms 58, 60, these outputs add in phase at the output arm 66 and arrive out of phase at the termination arm 62 because of the properties of the hybrid arrangement. A large output signal is thus present at the output arm 66. When a pulse 53 is then applied to oscillator 50, the output from that oscillator is switched 180° in phase. Under these conditions, the outputs from oscillator 50 and oscillator 50′ arrive at the output arm 66 out of phase, and no output is obtained. The signals add in phase at the termination arm 62 and the energy is absorbed in the termination 64 of the absorptively terminated arm 62, again because of the known properties of the hybrid junction 56.

The transmission lines 80—84, 80′—84′, illustrated schematically in FIGURE 6, may be of strip transmission line construction, in which case the filters 52, 52′ may also be of strip transmission line as fully described above in connection with FIGURE 4.

It is thus seen that either a high output or no output will be obtained from the hybrid junction 56 depending upon the state of the oscillator 50. The output may be switched by applying a pulse 53 to oscillator 50. For maximum discrimination between phases, it is necessary that the signals applied to input arms 58, 60 be equal in amplitude. This condition may be satisfied by including an adjustable attenuator 68 in either of the input lines, preferably in the one in series with the second input arm 60. By adjusting the position of the attenuator 68, the input to arm 60 may be suitably adjusted. For adjustment, the attenuator 68 may be rotated on a pivot pin at one corner thereof. The sector shape of the attenuator of FIGURE 6 is illustrative only.

Figure 7:
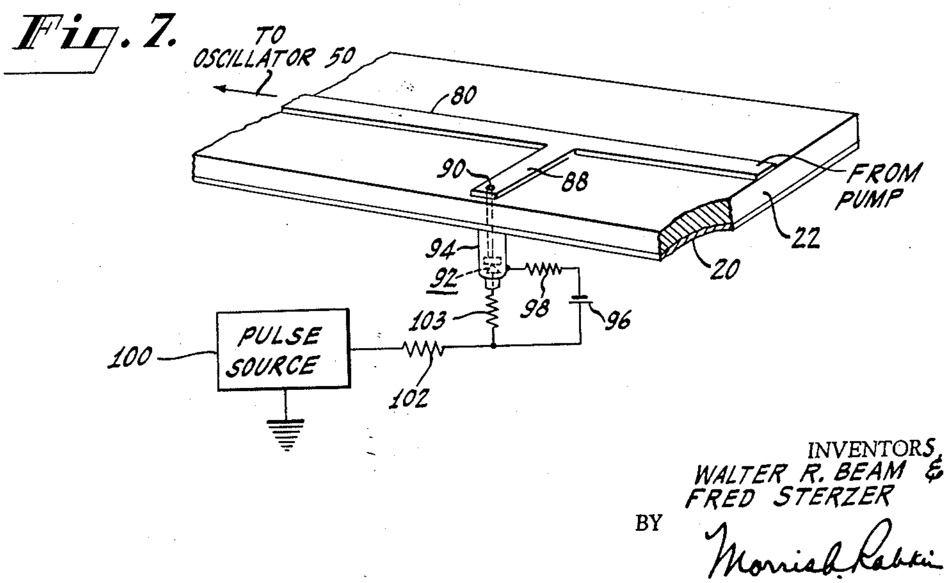
FIGURE 7 is a view partly in perspective and partly diagrammatic of a device for interrupting the coupling between the pump and the oscillator according to the present invention.

The parametric oscillator 50 may also be switched from one state to the other by interrupting the coupling, or sufficiently decreasing the coupling between the pump 1 and the oscillator 50 instead of by applying a pulse across the diode 39. FIGURE 7 illustrates, in perspective, a portion of the transmission line 80 of FIGURE 6. The transmission line is of strip transmission line construction. As explained heretofore, the pump signal must exceed a certain critical value to sustain oscillations in the parametric oscillator. A sufficient portion of the pump energy may be diverted from the oscillator through the use of a "limiter" of the type described in the copending application of Fred Sterzer, Serial Number 745,220, filed June 27, 1958, for "Logic Circuits," and assigned to the same assignee as the present invention.

The limiter includes a section 88 of strip transmission line which has an effective length of ¼ of a wavelength at the pump frequency. This section 88 is terminated at the end remote from the main transmission line 80 by a crystal diode 92. The diode may be mounted in a transducer 94 of the type previously described. The positive terminal of a suitable biasing source, such as battery 96, is connected through a resistor 103 to the anode of the crystal diode. The negative terminal of the battery 96 may be connected through a resistor 98 to the ground plate 20. When the diode 92 is so biased, substantially all of the pump signal is coupled to the oscillator 50.

A pulse source 100 provides positive pulses to overcome the bias of battery 96. The pulse source may be connected to the anode of the diode 92 through resistors 102, 103. When the diode 92 is biased in the back direction in response to an applied pulse, substantially no current flows through the diode 92. The section 88 is then a quarter wavelength line open circuited at its remote end, and the section 88 therefore appears as a short circuit at its junction with the main transmission line 80. Energy from the pump is reflected by this apparent short circuit and there is substantially no signal, or very little signal, coupled to the oscillator 50. The switch described is capable of handling only a few milliwatts of power. When this switch is used in the present invention, it is necessary to limit the power from the pump and amplify the output from the switch. A traveling wave tube amplifier is suitable for this purpose.

When the amplitude of the pump signal falls below the critical value, oscillations will not be sustained in the tank circuit. The effective capacitance of the variable-capacitance diode 39 will change in response to the lowered pump amplitude, and the oscillations will tend to die out at a frequency other than the frequency of the parametric oscillations. By a proper selection of the pulse duration, the phase in which oscillations resume upon removal of the pulse will be 180° out of phase with the original oscillations.

The circuit of FIGURE 6, and the circuit of FIGURE 6 modified by the arrangement of FIGURE 7, may be operated as bistable circuits at very high frequencies. Either circuit may be operated singly as a scale-of-two counter, or arranged with similar circuits in known fashion to form a binary counter. The circuits of FIGURES 4–7, incl., may also be of coaxial or wave guide construction. Strip transmission line, however, is preferable because the circuits may be operated at very high frequencies and because of the low noise associated with this type of construction. Strip transmission line has the further advantages of simplicity, reliability, and small size. As previously mentioned, certain types of variable capacitance diodes may be employed in the circuits described without the need for a fixed biasing source. It should be understood that the invention is not limited to the use of diodes as the variable reactance elements. Other types of variable reactance devices will serve equally well in certain application.

What is claimed is:

1. In combination, a parametric oscillator capable of representing the two binary digits by two different phases of oscillation at one frequency, means for changing the phase of oscillations of said oscillator at said one frequency of oscillation including D.C. signal applying means for momentarily changing the oscillations from said one frequency to a different frequency, and means for controlling the operation of said signal applying means for a given time interval such that the net difference between said one and said different frequencies has a value of the order of an odd number of half cycles at said one frequency during said interval.

2. A circuit comprising a parametric oscillator having an element of variable reactance, means for varying said reactance about a first average value at a rate causing sustained oscillations of said oscillator, and means for causing said reactance to assume a different average value to cause said oscillations to change in frequency for a selected period of time such that, with respect to said change in frequency, the phase of said oscillations is changed by an odd number of half cycles at said sustained oscillations frequency during said period.

3. In combination, a tank circuit having an element of variable reactance, said tank circuit having a natural frequency $f_0$, first signal means coupled to said circuit for varying said reactance at a rate causing parametric oscillations at a frequency $f_p/2$, said last mentioned frequency being close to said natural frequency, and second signal means coupled to said circuit for intermittently driving said circuit into an operating region where said parametric oscillations are not sustained to thereby provide damped oscillations at a frequency $f_2$ for a time interval T, said interval T being related to the frequencies $f_p/2$ and $f_2$ in the following manner:

$$T \cong \frac{N}{2}\left|\frac{1}{(f_p/2-f_2)}\right|$$

where N is any odd integer.

4. In combination, a parametric oscillator having an element of variable reactance, first means for driving said oscillator into parametric oscillation and for sustaining said oscillation, and second means for applying D.C. pulses to said oscillator for intermittently changing the frequency of oscillation of said oscillator for a selected time interval during which the number of half cycles gained or lost at the frequency of parametric oscillation is more nearly odd than even.

5. The combination set forth in claim 4 wherein said element is a variable capacitance diode.

6. The combination set forth in claim 4 wherein said first means comprises a source of pump signals and said second means comprises a source of D.C. signals of selected amplitude and length.

7. In a method of changing the phase of oscillation of a parametric oscillator circuit having an element of variable reactance and having signal means coupled to said circuit, the steps which comprise normally operating said signal means to provide signals for varying said reactance over a range of values at a rate to produce parametric oscillations at a first frequency in said circuit, and changing said range of reactance variation of said element to cause said oscillations partially to decay at a second frequency for a selected time interval during which the number of half cycles gained or lost at said first frequency is more nearly an odd number than an even number.

8. In a method of changing the phase of oscillations of a parametric oscillator circuit having an element of variable reactance and having pump signal means coupled to said circuit, the steps which comprise operating said signal means to provide pump signals for causing said circuit to oscillate parametrically, and simultaneously applying a further signal to said circuit to change the frequency of said oscillations for a selected time interval wherein the number of half cycles gained or lost at the parametric oscillating frequency is more nearly an odd number than an even number.

9. In combination, first and second parametric oscillators each having more than one distinct phase of oscillation at one frequency, a source of pump signals coupled to each of said oscillators for causing each of said oscillators to oscillate parametrically at said one frequency, means for causing the oscillations to decay selectively at a different frequency for a time interval during which the number of half cycles gained or lost at said one frequency is more nearly odd than even, and a phase comparator coupled to each of said oscillators for comparing the phase outputs of each of said oscillators.

10. The combination set forth in claim 9 wherein said means comprises a source of pulses of selected amplitude and length.

11. The combination set forth in claim 9 wherein said means comprises a switch for selectively decreasing the coupling between said source and said one of said oscillators.

References Cited in the file of this patent

UNITED STATES PATENTS

| | | |
|---|---|---|
| 2,751,555 | Kirkpatrick | June 19, 1956 |
| 2,815,488 | Von Neumann | Dec. 3, 1957 |
| 2,838,687 | Clary | June 10, 1958 |
| 2,928,053 | Kiyasu et al. | Mar. 8, 1960 |
| 2,948,818 | Goto | Aug. 9, 1960 |
| 2,957,087 | Goto | Oct. 18, 1960 |

FOREIGN PATENTS

| | | |
|---|---|---|
| 778,883 | Great Britain | July 10, 1957 |